US012522778B2

(12) United States Patent
Corbun et al.

(10) Patent No.: US 12,522,778 B2
(45) Date of Patent: Jan. 13, 2026

(54) USE OF A POLYALKOXYSILOXANE-BASED OIL AS A LUBRICATING AGENT

(71) Applicant: NYCO, Paris (FR)

(72) Inventors: Christophe Corbun, Nesles-la-Vallée (FR); Jean-Louis Mansoux, Le Plessis-Bouchard (FR); Christelle Louise, Houilles (FR); Grégoire Hervé, Paris (FR)

(73) Assignee: NYCO, Paris (FR)

( * ) Notice: Subject to any disclaimer, the term of this patent is extended or adjusted under 35 U.S.C. 154(b) by 0 days.

(21) Appl. No.: 18/708,779

(22) PCT Filed: Dec. 20, 2022

(86) PCT No.: PCT/EP2022/087059
§ 371 (c)(1),
(2) Date: May 9, 2024

(87) PCT Pub. No.: WO2023/118190
PCT Pub. Date: Jun. 29, 2023

(65) Prior Publication Data

US 2025/0101332 A1 Mar. 27, 2025

(30) Foreign Application Priority Data

Dec. 21, 2021 (FR) ....................................... 2114153

(51) Int. Cl.
*C10M 107/50* (2006.01)
*C08G 77/18* (2006.01)

(52) U.S. Cl.
CPC ........... *C10M 107/50* (2013.01); *C08G 77/18* (2013.01)

(58) Field of Classification Search
CPC ............................. C08G 77/18; C10M 107/50
See application file for complete search history.

(56) References Cited

U.S. PATENT DOCUMENTS 3,956,154 A * 5/1976 Marolewski ......... C10M 145/22 252/78.3
5,147,965 A * 9/1992 Ichinohe ................ C08G 77/38 528/31
10,011,801 B2 7/2018 Deklippel

FOREIGN PATENT DOCUMENTS

EP 0475440 A2 3/1992
EP 3692120 A1 8/2020
GB 1044274 A * 1/1999 ................ C07F 7/04

OTHER PUBLICATIONS

International Search Report for PCT/EP2022/087059, mailed Apr. 18, 2023, 4 pages.

(Continued)

*Primary Examiner* — Vishal V Vasisth
(74) *Attorney, Agent, or Firm* — NIXON & VANDERHYE

(57) ABSTRACT

The present invention relates to the use of a polyalkoxysiloxane base oil of formula (I)

(I)

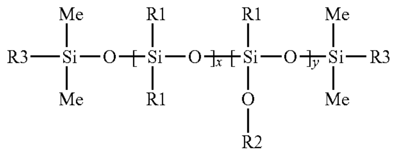

in which each R1 is independently a C1 to C4 alkyl group or a phenyl, each R2 is independently a C2 to C22 alkyl or alkenyl group or a phenyl, R3 is either a methyl group or a $CH_2$ group connected to the other R3 group by a single bond, thus forming a ring in which the 2 terminal silicon atoms are connected by a $CH_2$—$CH_2$ bridge, x is an integer between 0

(Continued)

and 50, y is an integer between 1 and 500 and such that the ratio y/x is strictly greater than 0.5, or of a mixture of polyalkoxysiloxane base oils of formula (I), as a lubricating agent.

16 Claims, 1 Drawing Sheet

(56) References Cited

OTHER PUBLICATIONS

Written Opinion of the ISA for PCT/EP2022/087059, mailed Apr. 18, 2023, 6 pages.
E.D. Brown, "Methyl Alkyl Silicones, A New Class of Lubricants", ASLE Trans., Sep. 30, 2015, 6 pages.

* cited by examiner

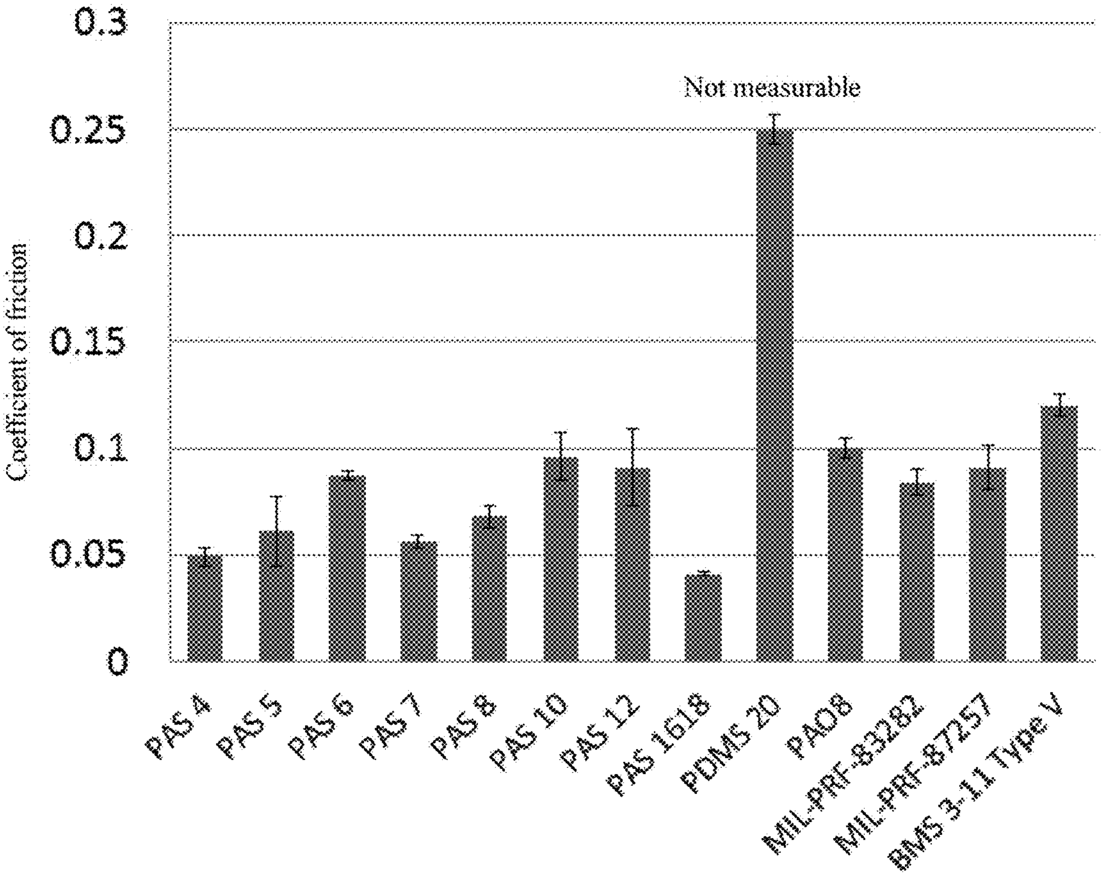
0.3
0.25
0.2
0.15
0.1
0.05
0
Coefficient of friction
Not measurable
PAS 4
PAS 5
PAS 6
PAS 7
PAS 8
PAS 10
PAS 12
PAS 1618
PDMS 20
PAO8
MIL-PRF-83282
MIL-PRF-87257
BMS 3-11 Type V

USE OF A POLYALKOXYSILOXANE-BASED OIL AS A LUBRICATING AGENT

This application is the U.S. national phase of International Application No. PCT/EP2022/087059 filed Dec. 20, 2022, which designated the U.S. and claims priority to FR Patent Application No. 2114153 filed Dec. 21, 2021, the entire contents of each of which are hereby incorporated by reference.

TECHNICAL FIELD

The present invention relates to the technical field of lubricants, in particular base oils for lubrication applications.

TECHNOLOGICAL BACKGROUND

In this field, a lubricating composition is generally composed of a base oil to which a certain number of additives are added, for adjusting the properties such as for example foaming, corrosion resistance, resistance to oxidation (via antioxidants) and resistance to wear (via additives against wear or extreme pressure).

Silicone oils, otherwise referred to as polydimethylsiloxanes (PDMSs), are used as base oils in certain industrial applications, in particular as a lubricant or dielectric fluid, in cosmetics or in instrumentation. The main advantage thereof relates to the good fluidity thereof, in particular at low temperature, which is characterised by a high viscosity index. The chemistry of silicones is also recognised for having advantageous thermal resistance and behaviour under fire, offering the user a very good level of safety in operation.

Moreover, this type of chemistry is also distinguished by a significantly improved toxicological aspect compared with that of other chemistries such as polyalphaolefins (some grades of which may be fatal in the event of ingestion or penetration in the respiratory tracts) or phosphate esters which, in addition, are category 2 carcinogens because of n-tributylphosphate.

Nevertheless, silicone oils, in particular PDMSs, have very low lubricity, as described in particular in the publication E. D. Brown, Methyl Alkyl Silicones, A New Class of Lubricants, Asle Trans. 1966, 9, 31-35. Furthermore, silicone oils, in particular PDMSs, have low compatibility with other components, in particular a very low compatibility with the additives conventionally used in the field. Thus it is difficult to substantially modify the properties of silicone oils by adding additives thereto, as is generally the case in the field of lubricating compositions.

The document U.S. Pat. No. 10,011,801 describes a method for copolymerising polyalkylphenylsiloxanes and alkylfluoroalkylsiloxanes, the resulting copolymer having lubricating properties. The copolymer formed thus comprises perfluorinated $R^1$ groups.

The document WO 2020/020476 relates to the supply of a novel hybrid grease with low coefficients of friction and with high protection against wear, which can be used in a wide range of temperatures. The novel hybrid grease is based on a combination of grease based on silicone oil associated with a grease based on synthetic hydrocarbon oils, mineral oils or polyglycols.

The document EP 0 475 440 describes a method for preparing an organopolysiloxane compound substituted by a higher alkoxy group (comprising at least 4 carbon atoms bonded to the silicon atom) able to be used as an ingredient in a wide variety of toilet and cosmetic products.

In this context, the Applicant has developed a novel family of polyalkoxysiloxane derivatives having lubrication properties appreciably better than those of polydimethylsiloxanes, and on the other hand keeping other advantageous physicochemical properties in ranges similar to those of polydimethylsiloxanes, such as for example a high viscosity index, high thermal resistance and non-flammability behaviour. These polyalkoxysiloxane derivatives furthermore have compatibility with the other components, in particular with the additives and the other families of synthetic and mineral base oils, unlike the usual polydimethylsiloxanes, which makes it possible advantageously to extend the use thereof by offering the possibility of modifying, adjusting and/or optimising the properties of the lubricating compositions the base oil of which comprises such a polyalkoxysiloxane.

SUMMARY OF THE INVENTION

The present invention relates to the use of a polyalkoxysiloxane base oil of formula (I):

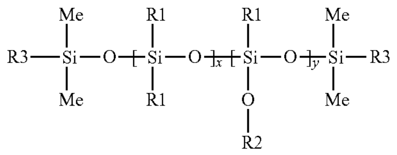

(I)

wherein

- each R1 is independently a C1 to C4 alkyl group or a phenyl,
- each R2 is independently a C2 to C22 alkyl or alkenyl group or a phenyl,
- R3 is either a methyl group, or a $CH_2$ group, connected to the other R3 group by a single bond, thus forming a ring in which the 2 terminal silicon atoms are connected by a $CH_2$—$CH_2$ bridge,
- x is an integer between 0 and 50,
- y is an integer between 1 and 500 and such that the ratio y/x (when $x \neq 0$) is strictly greater than 0.5,
- or a mixture of polyalkoxysiloxane base oils of formula (I),
- as lubricating agent.

Other non-limitative and advantageous features of the use according to the invention, taken individually or according to all technically possible combinations, are as follows:

- The polyalkoxysiloxane base oil comprises one or more polyalkoxysiloxanes of formula (I);
- x is equal to 0 and each R1 is selected independently from the methyl, ethyl and phenyl groups, in particular R1 is selected independently from the methyl and ethyl groups, in general R1 is a methyl group; typically R1 is not a phenyl group;
- each R2 is independently a C4 to C18 alkyl or alkenyl group, preferably C4 to C12, in particular R2 is independently a C4 to C18 alkyl group; typically R2 is not a phenyl;
- according to one feature of the invention, each R2 is independently a C4 to C22 alkyl or alkenyl group, or a phenyl, generally when R2 is a phenyl group the latter preferentially represents (in number) 70% or less, preferably 60% or less and typically 50% or less of the unit repeated y times;
- each R3 is a methyl group;

the polyalkoxysiloxane is selected from the group consisting of the polyalkoxysiloxanes of formula (I) in which:

x=0, y is between 1 and 140, each R1 is a methyl, each R3 is a methyl and each R2 is an n-butyl chain, x=0, y is between 1 and 140, each R1 is a methyl, each R3 is a methyl and each R2 is a heptyl chain, x=0, y is between 1 and 140, each R1 is a methyl, each R3 is a methyl and each R2 is a dodecyl chain, x=0, y is between 1 and 140, each R1 is a methyl, each R3 is a methyl and each R2 is a tetradecyl chain, and x=0, y is between 1 and 140, each R1 is a methyl, each R3 is a methyl and each R2 is selected from the group consisting of octadecenyl and hexadecyl chains;

the polyalkoxysiloxane base oil of formula (I) is used as a lubricating agent to form a dielectric fluid, a cooling fluid or a hydraulic fluid;

the polyalkoxysiloxane base oil of formula (i) is used in a mixture with at least one other base oil, as a co-base.

The invention also relates to a lubricating composition comprising a polyalkoxysiloxane base oil of formula (I) as described above and at least one additive.

The polyalkoxysiloxane base oil comprises one or more polyalkoxysiloxanes of formula (11).

Preferably, said at least one additive is selected from the group consisting of extreme-pressure additives, anti-wear additives, detergent additives, viscosity-modifying additives, antifoaming additives, antioxidant additives, flame retarders, corrosion inhibitors and a combination of at least two of said additives.

Advantageously, said composition comprises at least one flame-retarding additive, so as to obtain a non-flammable hydraulic fluid.

The invention also relates to polyalkoxysiloxanes of formula (II):

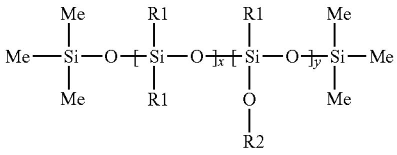

(II)

wherein each R1 is independently a C1 to C4 alkyl group or a phenyl, preferably R1 is independently a C1 to C4 alkyl group, such as a methyl group, each R2 is independently a C4 to C16 alkyl or alkenyl group, preferably a C4 to C12 alkyl or alkenyl group or a phenyl, x is an integer between 0 and 50, y is an integer between 1 and 500, and such that the ratio y/x (when $X \neq 0$) is strictly greater than 0.5, preferably greater than or equal to 0.6.

According to one feature of the invention, each R2 is independently a C4 to C16 alkyl or alkenyl group, or a phenyl; preferentially, when R2 is a phenyl group, the latter represents (in number) 70% or less, preferably 60% or less and typically 50% or less of the unit repeated y times.

According to the invention, "R2 is a phenyl group, this represents (in number) 70% or less of the unit repeated y times" comprises the following values (%) and any interval between these values: 70; 69; 68; 67; 66; 65; 64; 63; 62; 61; 60; 59; 58; 57; 56; 55; 54; 53; 52; 51; 50; 49; 48; 47; 46; 45; 44; 43; 42; 41; 40; 39; 38; 37; 36; 35; 34; 33; 32; 30; 25; 20; 15; 10; 5, etc.

Finally, the invention relates to particular polyalkoxysiloxanes, selected from the group consisting of polyalkoxysiloxanes of formula (II) in which:

x=0, y is between 1 and 140, preferably between 40 and 80, each R1 is a methyl, and each R2 is an n-butyl (PAS4) chain, x=0, y is between 1 and 140, preferably between 40 and 80, each R1 is a methyl, and each R2 is a heptyl (PAS7) chain, x=0, y is between 1 and 140, preferably between 40 and 80, each R1 is a methyl, and each R2 is a dodecyl (PAS12) chain, x=0, y is between 1 and 140, preferably between 40 and 80, each R1 is a methyl, each R3 is a methyl and each R2 is a tetradecyl (PAS14) chain, and x=0, y is between 1 and 140, preferably between 40 and 80, each R1 is a methyl, and each R2 is selected from the group consisting of octadecenyl and hexadecyl (PAS16-18) chains.

In the present invention, unless specified to the contrary, the term "comprise" and the derivatives thereof must be understood as being non-limitative and not excluding the presence of other components or steps. In some particular embodiments, the term "comprise" can be understood as "consisting essentially of" or "consisting of".

Unless specified to the contrary, the intervals mentioned in the present invention mean bounds included.

Naturally, the various features, variants and embodiments of the invention can be associated with each other in accordance with various combinations provided that they are not incompatible or exclusive of each other.

BRIEF DESCRIPTION OF THE FIGURE

In addition, various other features of the invention emerge from the accompanying description made with reference to the drawings, which illustrate non-limitative embodiments of the invention and where:

FIG. 1 presents the results of measurements of coefficients of friction for various polyalkoxysiloxanes according to the invention.

DETAILED DESCRIPTION OF THE INVENTION

The present invention relates first of all to the use of a polyalkoxysiloxane base oil of formula (I)

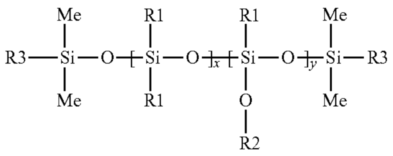

(I)

wherein each R1 is independently a C1 to C4 alkyl group or a phenyl, each R2 is independently a C2 to C22 alkyl or alkenyl group or a phenyl, R3 is either a methyl group or a CH2 group connected to the other R3 group by a single bond, thus forming a ring in which the 2 terminal silicon atoms are connected by a $CH_2$—$CH_2$ bridge, x is an integer between 0 and 50, y is an integer between 1 and 500 and such that the ratio y/x (when x≠0) is strictly greater than 0.5.

or of a mixture of polyalkoxysiloxane base oil of formula (I), as lubricating agent.

"Ci to Cj alkyl group" means a saturated hydrocarbon group, linear, branched or cyclic, comprising from i to J carbon atoms, and optionally interrupted by one or more heteroatoms, such as O or S. As examples of C1 to C18 alkyl groups, the methyl, ethyl, n-propyl, isopropyl, n-butyl, sec-butyl, iso-butyl, tert-butyl, n-pentyl, n-hexyl, cyclohexyl, n-heptyl, n-octyl, n-nonyl, n-decyl, n-undecyl, n-dodecyl, n-tetradecyl, n-hexadecyl and n-octadecenyl groups can be cited. In general, a Ci to Cj alkyl group according to the invention is a linear saturated group or a branched saturated group, and preferably is a linear saturated group.

"Ci to Cj alkenyl group" means an unsaturated hydrocarbon group, linear, branched or cyclic, comprising from i to J carbon atoms, and optionally interrupted by one or more heteroatoms, such as O or S. The alkenyl group may comprise one or more unsaturations such as double bonds between two carbon atoms. Preferably, the alkenyl group comprises a single unsaturation. Preferably, the unsaturation or unsaturations of the alkenyl group are double bonds between two carbon atoms. As examples of C2 to C18 alkenyl groups, the ethenyl, propenyl, butenyl, pentenyl, hexenyl, cyclohexenyl, heptenyl, octenyl, nonenyl, decenyl, undecenyl, dodecenyl, tetradecenyl, hexadecenyl and octadecenyl groups can be cited. Preferably, an alkenyl group according to the invention is linear or branched, in particular linear.

According to the invention, "phenyl" commonly means a univalent benzene group including six carbon atoms bonded to five carbon atoms.

In one embodiment, each R1 is independently selected from the group consisting of a methyl group, an ethyl group and a phenyl group. Preferably, all the R1s are methyl groups, or all the R1s are ethyl groups or all the R1s are phenyl groups. In particular, all the R1s are methyl groups.

In one embodiment, each R2 is independently a C2 to C22 alkyl or alkenyl group, preferably C2 to C18, preferably C4 to C18, preferably C4 to C16, preferably C4 to C12.

In one embodiment, each R2 is independently a C2 to C22 alkyl group, preferably C2 to C18, preferably C4 to C18, preferably C4 to C16, preferably C4 to C12.

According to the invention, a group comprising a number of carbon atoms ranging from "C2 to 022" means the following values or any other interval lying between these values: 2; 3; 4; 5; 6; 7; 8; 9; 10; 11; 12; 13; 14; 15; 16; 17; 18; 19; 20; 21; 22.

The R2 chains may be all identical in the same compound of formula (I), but may also be different in pairs. In particular, the use of R2 chains of different lengths in the same compound of formula (I) may make it possible to add together the advantages in terms of properties of the compounds of formula (I) with R2 chains of each of the lengths.

According to one embodiment, in one and the same compound of formula (I), all the R2 chains identical.

According to another embodiment, in the same compound of formula (I), the R2 chains are different. According to this embodiment, each R2 is independently a C2 to C18 alkyl or alkenyl group, preferably C2 to C16, typically C2 to C14, such as C7, and a phenyl group. Preferentially, when it is present in the compound of formula (I), the phenyl group represents (in number) 70% or less, preferably 60% or less, and typically 50% or less of the unit repeated y times. By way of example, R2 is independently a C2 to C18 alkyl group, preferably C2 to C16, typically C2 to C14, such as C7, and a phenyl group, the latter representing, in number, 50% or less of the unit repeated y times.

In one embodiment, each R3 is a methyl group.

x is an integer between 0 and 50, y is an integer between 1 and 500.

According to the invention, a range "between 0 and 50" means the following values or any interval lying between these values: 1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 45; 50. Likewise, according to the invention, a range "between 1 and 500" means the following values or any interval lying between these values: 1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 45; 50; 55; 60; 65; 70; 75; 80; 85; 90; 95; 105; 110; 115; 120; 125; 130; 135; 140; 145; 150; 155; 160; 165; 170; 175; 180; 185; 190; 195; 200; 205; 210; 215; 220; 225; 230; 235; 240; 245; 250; 260; 270; 280; 290; 300; 310; 320; 330; 340; 350; 360; 370; 380; 390; 400; 410; 420; 430; 440; 450; 460; 470; 480; 490; 500.

Preferably, x is between 0 and 25.

In general, y is between 1 and 150, in particular between 1 and 140. Typically, y is between 1 and 80. The sum x+y is between 1 and 500.

According to the invention, the ratio y/x is strictly greater than 0.5. In the context of the invention, a range "strictly greater than 0.5" comprises the following values or any interval between these values: 0.5; 0.6; 0.7; 0.8; 0.9; 1.0; 1.1; 1.2; 1.3; 1.4; 1.5; 1.6; 1.7; 2, 2.5; 3; 3.5; 4.0; 4.5; 5.0; 5.5; 6.0; 6.5; 10; 15; 20; 25; 30; 35; 40; 45; 50; 55; 60; 65; 70; 75; 80; 95; 100; 110; 120; 130; 140; 150; 160; 170; 180; 190; 200; 210; 220; 230; 240; 250; etc.

The molar mass of the polyalkoxysiloxane of formula (I) is typically between 300 g/mol and 200,000 g/mol, preferably between 300 g/mol and 30,000 g/mol. The molar mass can in particular be measured by gel permeation chromatography (GPC).

In one embodiment; x is equal to 0. This means that the polyalkoxysiloxane comprises only alkoxylated (or phenoxylated) units. In a preferred embodiment, x is zero and y is between 1 and 140, in particular x is zero and y is between 1 and 80.

According to the invention, the polyalkoxysiloxane oil can comprise a mixture of derivatives of formula (I) of various lengths, i.e. for which the values of x and/or y are not all the same. In this case, it is possible, for a polyalkoxysiloxane oil according to the invention, to define a mean value of x and/or a mean value of y. Preferably, the mean value of y in a polyalkoxysiloxane oil according to the invention is between 50 and 60.

According to the invention, the polyalkoxysiloxane oil can comprise a mixture of polyalkoxysiloxane base oils of formula (I) having different substitutions from R1, R2 or R3.

According to one feature of the invention, the mixture of polyalkoxysiloxane base oils of formula (I) can correspond to and/or is obtained from a physical mixture of various oils previously synthesised separately.

According to another feature of the invention, the mixture of polyalkoxysiloxane base oils of formula (I) can be obtained during the same chemical synthesis, for example when a mixture of alcohols having varied chain lengths is used. In this way, during the same synthesis, a mixture of polyalkoxysiloxane base oils of formula (I) is obtained wherein the R2 group varies between the oils (it is thus possible to obtain a mixture of polyalkoxysiloxane base oils of formula (I) that can comprise a first polyalkoxysiloxane oil wherein the R2 group is a hexadecyl (C16) group and a polyalkoxysiloxane oil wherein the R2 group is an octadecenyl (C18) group).

The polyalkoxysiloxane of formula (I) can, in the case where x is different from 0, be a block polymer, an alternating polymer, or a random or statistical polymer. Preferably, the polyalkoxysiloxane of formula (I) is an alternating, random or statistical polymer.

"Lubricating agent" means an agent which, when it is used alone or in a composition, makes it possible to reduce the friction between two surfaces in movement with respect to each other.

The Applicant has discovered unexpectedly that the polyalkoxysiloxane base oils of formula (I) according to the invention have coefficients of friction (CoF) lower than those of polysiloxanes, such as PDMS and polyalphaolefins (PAO), and even than those of other fluids based on organophosphates used in the hydraulics field, and this under particular conditions. This confirms their superiority in terms of lubricity compared with the latter. In particular, the CoF measured for the polyalkoxysiloxanes of formula (I) are below 0.1, which indicates good performances. Under the same conditions, the CoF measured for the reference polydimethylsiloxanes, organophosphates (marketed for example under the tradename Skydrol®) and polyalphaolefins are greater than or equal to 0.1. Said particular conditions are as follows: mixed lubrication regime, speed 100 mm/s, pure sliding, load of 40 N (pressure 1.02 GPa), temperature 75° C.

"Coefficient of friction CoF" means a non-dimensional characteristic intrinsic to a base oil and indicating the ability of a film of base oil to reduce the friction between two surfaces. The value of the coefficient of friction, also known by the term lubricating power, is highly dependent on the lubrication regime. The coefficient of friction can be measured by means of a traction machine such as a Mini Traction Machine (MTM) equipped with AISI 52100 steel ball and disc. In particular, the tests can be implemented at a speed of 100 mm/s, in pure sliding (Sliding Rolling Ratio of 200%), under a load of 40 N equivalent to a contact pressure of 1.02 GPa and at a temperature of 75° C., for one hour.

Friction is a force that opposes the relative movements of two surfaces in contact. It depends on several factors such as the surface state, the temperature, the normal power, the sliding speed, etc. High friction between two surfaces (which is characterised by a high coefficient of friction) will lead to wear on the moving bodies. The best means of reducing this risk is to add a lubricant between the surfaces, so that these are, in a hydrodynamic lubrication regime, not in direct contact. The coefficient of friction depends on the characteristics of the system and its change is graphically illustrated by the Stribeck curve.

Selecting the hydrodynamic regime makes it possible to characterise the lubricity of a base oil, under conditions of pressure, temperature and speed that are relatively standard for undemanding lubrication systems such as pumps and other accessories present in hydraulic circuits.

The polyalkoxysiloxane base oils of formula (I) have high viscosity indices, in particular viscosity indices higher than 200, preferably higher than 300, similar to those recorded for PDMSs (>350) and appreciably higher than those of polyalphaolefins in particular. This means that the polyalkoxysiloxane base oils according to the invention have great fluidity over a wide thermal amplitude, in particular at low temperature. Low temperature preferably means a temperature below −40° C., in particular below −50° C. The viscosity index can be measured by any technique known in the art. It is preferentially measured according to the standardised method known by the term ASTM D2270.

The polyalkoxysiloxane base oils of formula (I) can be used either alone or in the form of a mixture of at least two polyalkoxysiloxane base oils of formula (I), or in a mixture with at least one "other base oil", as a co-base or majority base, preferably as co-base. Preferably, the polyalkoxysiloxane base oil of formula (I) is used in the absence of another base oil.

Among the other base oils able to be mixed with the polyalkoxysiloxane base oils according to the invention, mention can be made of polyalphaolefins, polydimethylsiloxanes and synthetic esters, in particular diesters. These other base oils are known to a person skilled in the art and consequently will not be detailed hereinafter.

This is because the polyalkoxysiloxane base oils according to the invention are, unlike polydimethylsiloxanes, compatible with these various other base oils, in particular at high temperature, but also for certain other base oils at low temperature, in particular for the other base oils of low viscosity. The polyalkoxysiloxane base oil according to the invention and the other base oil can be used in the mixture in all mass proportions ranging from 100:0 to 0:100 (bounds excluded), preferably ranging from 10:90 to 90:10 (bounds inclusive), and thus encompassing the following mass proportions (bounds included) 10:90, 50:50 or 90:10.

The polyalkoxysiloxane base oils of formula (I) according to the invention can also be used as a dielectric fluid. This is because the physicochemical characteristics thereof such as their insulating properties, their pour point, their kinematic viscosity, their flashpoint, their fire.point and/or their autoignition temperature are perfectly adapted so that these base oils constitute a good dielectric fluid. Thus, according to the present invention, the polyalkoxysiloxane base oil of formula (I) preferably simultaneously fulfils the functions of lubrication and dielectric strength. This is particularly adapted when the polyalkoxysiloxane base oil of formula (I) according to the invention is used as a lubricant in a system requiring electrical insulation, cooling, electric-arc extinction and/or limitation, and/or reduction in partial discharges, such as for example electrical transformers: traction transformers, power transformers, wind-turbine transformers, offshore transformers, distribution transformers, etc.

In addition, the polyalkoxysiloxane base oil of formula (I) according to the invention is perfectly adapted for lubricating hydraulic systems, whether for small-sized independent systems, such as actuators (a few litres of fluids), or for centralised hydraulic systems of large size providing the transmission of commands (>100 L of fluid). It can also be adapted to fluids present in landing gear, radar fluids and other dielectric fluids used in military or space applications. By virtue of its low coefficient of friction (CoF), the polyalkoxysiloxane base oil of formula (I) according to the invention can in particular perfectly lubricate the pumps of a hydraulic system, providing a long-term level of protection against wear, and consequently guaranteeing perfect longevity of the equipment and mechanical components.

Because of their advantageous technical characteristics as previously mentioned, the polyalkoxysiloxane base oils of formula (I) according to the invention can also be used as hydraulic fluid. The performance level of these alternative formulations can easily be validated as being equivalent or superior to that of reference fluids such as, for example, the phosphate esters that are widely used in commercial aviation (cf. example 2 below).

The polyalkoxysiloxanes of formula (I) according to the invention can be synthesised by any technique known to a person skilled in the art. The polyalkoxysiloxanes of formula (I) can in particular be synthesised by methods such as those described in the patent applications EP 0475440 and WO 2014/099497. However, the Applicant found that replacing the reported catalytic systems (palladium or platinum catalyst with, optionally, the addition of carboxylic acids) with bases well known to a person skilled in the art (e.g. caesium fluoride CsF) could advantageously improve the conversion rate and therefore the yield of the reaction as well as the selectivity thereof.

By way of example, the catalytic system can comprise at least one or more catalysts selected from: CsF, CsOH, Cs(TFA), KOH, $Ba(OH)_2$, $Ca(OH)_2$, $Sr(OH)_2$, $Ba(OH)_2$, $CH_3COOLi$, NaOH, metal hydroxides, metal carboxylates, organic bases such as tertiary amines or other aromatic or non-basic nitrogenous heterocycles (alkylated pyridine, morpholine, piperidine and piperazine, etc). In general, the catalytic system comprises caesium fluoride CsF or caesium hydroxide (CsOH) and is advantageously caesium hydroxide (CsOH). The latter compound has the advantage of being less toxic than CsOH and is also simpler to use.

The invention also relates to a lubricating composition comprising a polyalkoxysiloxane base oil of formula (I) as defined above and a mixture of these, and at least one additive.

"Additive" means in particular a chemical product that is added to the lubricating product to improve certain properties thereof for applications thereof as a lubricating agent.

The at least one additive included in the lubricating composition according to the invention can be selected from the additives well known to a person skilled in the art. It can in particular be selected from the group consisting of additives adapted to extreme pressures, anti-wear additives, detergent additives, viscosity-modifying additives, anti-foaming additives, amine and phenol antioxidant additives, corrosion inhibitors, flame-retarding additives and a combination of at least two of said additives.

As examples of additives adapted to extreme pressures, mention can be made in particular of zinc dithiophosphate and $MoS_2$ or molybdenum bisulfide.

As examples of anti-wear and/or extreme-pressure additives, mention can be made in particular of sulfides, chlorides, organophosphates, aryl and/or, alkyl phosphates and metal phosphates, for example zinc dialkyldithiophosphates (ZDDP).

As examples of anti-foaming additives, mention can be made in particular of silicones.

As examples of flame-retarding additives, mention can be made of organophosphates with a high autoignition point.

As examples of antioxidant additives, mention can be made in particular of phenols, aromatic amines and sulfuretted additives such as zinc dithiophosphates. The additives marketed under the names Vanlube 81® and Naugalube® 438 (4,4'-dioctyldiphenylamine), Irganox® L 06 (octylated N-phenyl-1-naphtylamine) are in particular examples of aromatic organic amines. The additives marketed under the names Irganox® L109 (hexamethylene glycol bis(3,5-di-tertbutyl-4-hydroxy-hydrocinnamate)) and Ionol® 220 AH (4,4'-methylenebis(2,6-di-tertbutylphenol)) are examples of phenolic antioxidant additives.

As examples of corrosion inhibitors soluble in oil, mention can be made for example of agents based on zinc, sulfonates, sorbitan esters, phosphates and amine phosphates.

The examples of detergent and/or viscosity-modifying additives are well known to persons skilled in the art.

In one embodiment, the lubricating composition according to the invention comprises at least two, at least three, at least four, at least five, at least six, different additives.

In one embodiment, the composition comprises fewer than ten additives or ten different additives.

Each of the additives present in the lubricating composition according to the invention is advantageously present in a quantity ranging from 0.001% to 35% by weight, and preferably between 01% and 15% by weight, with respect to the total weight of said lubricating composition.

The lubricating composition according to the invention advantageously comprises a quantity of polyalkoxysiloxane base oil according to the invention ranging from 50% to 99.9999% by weight with respect to the total weight of the lubricating composition, preferably a quantity of polyalkoxysiloxane base oil according to the invention of 60 to 99%, in particular 75 to 95%. The other components of said composition are preferably selected from other base oils and additives, in particular the additives as described above or other types of additive known in the art.

The other base oils able to be mixed with a base oil according to the invention or able to be included in a lubricating composition according to the invention are the same as those mentioned previously and can in particular be mineral lubricating oils, or synthetic lubricating oils such as synthetic esters, or polyalphaolefins.

The lubricating composition according to the invention can be used in various fields, in particular in industry, in energy, in the marine field, in the automobile field and/or in aeronautics. Thus it can in particular be used as a hydraulic fluid, as an engine oil, as an oil adapted for energy transfer and/or as a turbine lubricant. It can advantageously be used in all the fields where silicone oils are used, while generally having more advantageous characteristics.

The invention also relates to a polyalkoxysiloxane of formula (II) able to and/or configured to form a base oil of a lubricating composition.

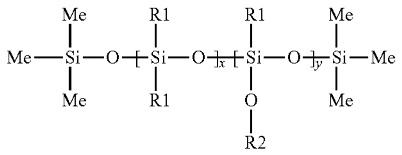

(II)

wherein:

each R1 is independently a C1 to C4 alkyl group or a phenyl, each R2 is independently a C4 to C16 alkyl or alkenyl group, preferably C4 to C14, in particular C4 to C12 or a phenyl, x is an integer between 0 and 50, y is an integer between 1 and 500, and such that the ratio y/x (when X≠0) is strictly greater than 0.5, preferably greater than or equal to 0.6.

According to the invention, C4 to C16 alkyl or alkenyl group means a group comprising from 4 to 16 carbon atoms or any interval lying between: 4; 5; 6; 7; 8; 9; 10; 11; 12; 13; 14; 15; 16.

The polyalkoxysiloxanes of formula (II) constitute a particular subgroup of the polyalkoxysiloxanes of formula (I) as previously defined. Thus the aforementioned characteristics also apply to the general formula (II) except when otherwise specified below.

In one embodiment, each R1 in formula (II) is independently selected from the group consisting of a methyl group, an ethyl group and a phenyl group. Preferably, all the R1s are ethyl groups, all the R1s are ethyl groups or all the R1s are phenyl groups. In particular, all the R1s are methyl groups.

In one embodiment, each R2 in formula (IRI) is independently an alkyl or alkenyl group, preferably alkyl, C4 to C14, preferably C4 to C12.

In one embodiment, each R2 in formula (II) is independently a C4 to C14 alkyl group, preferably C4 to C12.

The R2 chains may be all identical in the same compound of formula (II), but may also be different in pairs.

Thus, according to one embodiment, in one and the same compound of formula (II), all the R2 chains are identical.

According to another embodiment, in one and the same compound of formula (II), the R2 chains are different in the units repeated y times. According to this embodiment, each R2 is independently a C2 to C16 alkyl or alkenyl group, preferably C2 to C14, typically C2 to C12, such as C7, and a phenyl group. Generally, the phenyl group represents, in number, 70% or less, preferably 60% or less, in particular 50% or less of the unit repeated y times. By way of example, R2 is independently a C2 to C16 alkyl group, preferably C2 to C14, typically C2 to C 12, such as C7, and a phenyl group, the latter representing, in number, 50% or less of the unit repeated y times.

In formula (II), x is an integer between 0 and 50, y is an integer between 1 and 500. Preferably, x is between 0 and 25. Preferably, y is between 1 and 150, preferably between 1 and 140. In particular, y is between 1 and 80. Preferably, the sum x+y is between 1 and 500.

According to the invention, a range "between 0 and 50" means the following values or any interval included in these values: 1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 45; 50. Likewise, according to the invention, a range "between 1 and 500" means the following values or any interval lying between these values: 1; 2; 3; 4; 5; 6; 7; 8; 9; 10; 11; 12; 13; 14; 15; 16; 17; 18; 19; 20; 21; 22; 23; 24; 25; 26; 27; 28; 29; 30; 31; 32; 33; 34; 35; 36; 37; 38; 39; 40; 45; 50; 55; 60; 65; 70; 75; 80; 85; 90; 95; 105; 110; 115; 120; 125; 130; 135; 140; 145; 150; 155; 160; 165; 170; 175; 180; 185; 190; 195; 200; 205; 210; 215; 220; 225; 230; 235; 240; 245; 250; 260; 270; 280; 290; 300; 310; 320; 330; 340; 350; 360; 370; 380; 390; 400; 410; 420; 430; 440; 450; 460; 470; 480; 490; 500.

According to the invention, the ratio y/x is strictly greater than 0.5. In the context of the invention, a range "strictly greater than 0.5" comprises the following values or any interval between these values: 0.5; 0.6; 0.7; 0.8; 0.9; 1.0; 1.1; 1.2; 1.3; 1.4; 1.5; 1.6; 1.7; 2, 2.5; 3; 3.5; 4.0; 4.5; 5.0; 5.5; 6.0; 6.5; 10; 15; 20; 25; 30; 35; 40; 45; 50; 55; 60; 65; 70; 75; 80; 95; 100; 110; 120; 130; 140; 150; 160; 170; 180; 190; 200; 210; 220; 230; 240; 250; etc.

The molar mass of the polyalkoxysiloxane of formula (II) is typically between 300 g/mol and 200,000 g/mol, preferably between 300 g/mol and 30,000 g/mol.

In one embodiment, x is equal to 0 in formula (II). This means that the polyalkoxysiloxane comprises only alkoxylated (or phenoxylated) units. In a preferred embodiment, x is zero and y is between 1 and 140 in the formula (II), in particular x is zero and y is between 1 and 80.

Finally, the invention relates to particular polyalkoxysiloxanes, selected from the group consisting of the polyalkoxysiloxanes of formula (II) wherein:

x=0, y is between 1 and 140, each R1 is a methyl, and each R2 is an n-butyl (PAS4) chain, x=0, y is between 1 and 140, each R1 is a methyl, and each R2 is a heptyl (PAS7) chain, x=0, y is between 1 and 140, each R1 is a methyl, and each R2 is a dodecyl (PAS12) chain, x=0, y is between 1 and 140, each R1 is a methyl, and each R2 is a tetradecyl (PAS14) chain, and x=0, y is between 1 and 140, each R1 is a methyl, and each R2 is selected from the group consisting of octadecenyl and hexadecyl (PAS16-18) chains.

In one embodiment, independently for each of the particular polyalkoxysiloxanes according to the invention, y is between 1 and 80. In another embodiment, independently for each of the polyalkoxysiloxanes according to the invention, a mean value of y is between 50 and 60.

The invention can also relates to a lubricating composition comprising as lubricating agent the polyalkoxysiloxane base oil of formula (I) or (II) (namely able to comprise one or more polyalkoxysiloxanes of formula (I) or (II)), as well as at least one additive, with optionally at least one other base oil (different from the polyalkoxysiloxanes of formula (I) or (II) according to the invention), as co-base; these compounds being as defined above.

EXAMPLES

The following examples are intended to illustrate the invention without limiting the scope thereof.

Example 1: Synthesis of Polyalkoxysiloxanes According to the Invention (the Catalyst is Caesium Fluoride CsF)

The synthesis of the polyalkoxysiloxanes according to the invention is implemented in accordance with the following protocol:

Conditions

The synthesis of the polyalkoxysiloxane compounds according to the invention must absolutely be implemented under anhydrous conditions requiring washing and drying of all the elements of the assembly under nitrogen scavenging;

Device

In order to implement synthesis of the polyalkoxysiloxanes according to the invention, use was made of a 6 L reactor with grooved-flange neck of the cylindrical "Schott" type marketed by the company Belleville SA, this being surmounted by a four-necked lid.

The reactor is equipped with a water condenser in order to condense the alcohol vapours during the reaction and is maintained under nitrogen flow, as well as with a mechanical stirring system.

Synthesis a) an alcohol (as defined in table 1 below) is introduced in excess (approximately 10% by mass with respect to the stoichiometric quantity corresponding to the number of moles of Si—H contained in a polymethylhydrosiloxane that will be used hereinafter) in the reactor and maintained under a nitrogen flow to a temperature of 75-80° C.;

b) when the reaction medium is anhydrous, the catalyst (caesium fluoride CsF) is introduced (ideally 0.005% by mass with respect to the total mass of the reaction medium);

c) the polymethylhydrosiloxane (PHMS), entitled Silres® BS 94 (marketed by Wacker), is next added dropwise while controlling the flow rate to avoid the reaction running away;

d) the precise advancement of the reaction can be determined by infrared by checking the diminution, and then the disappearance, of the characteristic band "Si—H" (≈2170 $cm^{-1}$);

e) once the reaction has ended, the catalyst is extracted from the reaction medium by filtration and the excesses of alcohol are next distilled under vacuum.

The polyalkoxysiloxanes according to the invention that were synthesised in accordance with the above protocol are presented in table 1 below.

TABLE 1

| PAS | Alcohol introduced into the synthesis | R1 | R2 | R3 | x | Polymeric fraction y |
|---|---|---|---|---|---|---|
| PAS4 | n-butanol | methyl | n-butyl | methyl | 0 | 1 to 140 |
| PAS5 | n-pentanol | methyl | n-pentyl | methyl | 0 | 1 to 140 |
| PAS6 | n-hexanol | methyl | n-hexyl | methyl | 0 | 1 to 140 |
| PAS7 | n-heptanol | methyl | n-heptyl | methyl | 0 | 1 to 140 |
| PAS8 | n-octanol | methyl | n-octyl | methyl | 0 | 1 to 140 |
| PAS9 | n-nonanol | methyl | n-nonyl | methyl | 0 | 1 to 140 |
| PAS10 | n-decanol | methyl | n-decyl | methyl | 0 | 1 to 140 |
| PAS12 | Lauric alcohol | methyl | n-dodecyl | methyl | 0 | 1 to 140 |
| PAS16-18 | Mixture cetyl and oleic alcohols (NAFOL 1618) | methyl | n-hexadecyl n-octadecenyl | methyl | 0 | 1 to 140 |

The mean value of y for each of the polyalkoxysiloxane oils in table 1 is between 50 and 60.

Example 2: Synthesis of Polyalkoxysiloxanes According to the Invention (the Catalyst is Caesium Hydroxide CsOH)

The synthesis of polyalkoxysiloxanes according to example 2 is illustrated below:

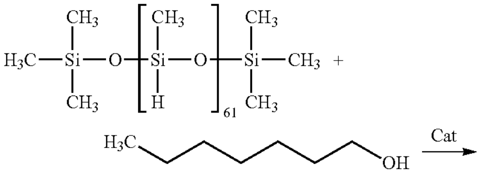

-continued

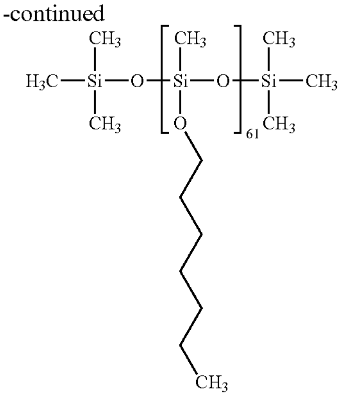

The synthesis of the polyalkoxysiloxanes according to the invention is implemented in accordance with the following protocol:

The conditions and the device used are identical to those of example 1 described above.

Synthesis a) 972 g of heptanol is introduced in excess in the reactor and maintained under a nitrogen flow to a temperature of 20° C. for 10 minutes;

b) 0.939 g of catalyst (caesium hydroxide $CsOHn{\cdot}H_2O_2$) is introduced (ideally 0.07% by mass with respect to the total mass of the reaction medium);

c) 400 g of polymethylhydrosiloxane (PHMS), entitled Silres® BS 94 (marketed by Wacker), is next added dropwise using a pouring ampoule while controlling the flow rate (of the order of 1.7 mL/mm) to avoid the reaction running away;

d) the reaction is exothermic, the temperature of the reaction medium is gradually increased up to 65° C. before stabilising;

e) the precise advancement of the reaction can be determined by infrared by checking the diminution and then the disappearance of the characteristic band "SI-H" for (≈2170 $cm^{-1}$);

f) after complete addition of the polymethylhydrosiloxane (PMHS), the reaction medium is allowed to gradually return to ambient temperature (approximately 3 hours of time);

g) once the reaction has ended, the catalyst is extracted from the reaction medium by filtration on a bed of dicalite and silica and the excesses of alcohol are next distilled under reduced pressure (2 mbar, 100° C. for 2 hours);

h) the distillation residue is filtered on filter paper before packaging.

The polyalkoxysiloxanes synthesised according to this example are as follows:

TABLE 2

| PAS | Alcohol introduced in the synthesis | R1 | R2 | R3 | x | Polymeric fraction y |
|---|---|---|---|---|---|---|
| PAS7 | n-heptanol | methyl | n-heptyl | methyl | 0 | 1 to 140 |

The mean value of y each of the polyalkoxysiloxane oils of table 1 is of the order of 61.

Example 3: Characterisation of the Polyalkoxysiloxanes of Examples 1 and 2

Characteristics Tested

* Coefficient of Friction

The coefficient of friction (CoF) was measured for each polyalkoxysiloxane synthesised at example 1, under the following conditions: mixed lubrication regime, speed 100 m/s, pure sliding, load of 40 N (pressure 1.02 GPa), temperature 75° C.

In particular, the coefficient of friction is measured by means of a Mini Traction Machine (MTM) equipped with AISI 52100 steel ball and disc, at a speed of 100 mm/s, in pure sliding (Sliding Rolling Ratio of 200%), under a load of 40 N equivalent to a contact pressure of 1.02 GPa and at a temperature of 75° C., for one hour.

* Kinematic Viscosity

The kinematic viscosity at various temperatures (100° C., 40° C., −40° C.) was measured in accordance with ASTM D445/2532 respectively at 35 minutes, 3 hours, 72 hours and after 72 hours.

* Viscosity Index

The viscosity index was measured in accordance with the ASTM D2270 method.

* Flashpoint

The flashpoint was measured in accordance with ASTM D92.

* Fire Point

The fire point was measured in accordance with ASTM D92.

The autoignition point was measured in accordance with ASTM E659.

* Flow Point

The flow point was measured in accordance with ASTM D97.

* Stability Under KRL Mechanical Shearing after 100 Hours

Stability under KRL mechanical shearing after 100 hours was measured in accordance with the modified CEC L 45-A-99 method.

Results

FIG. 1 presents the results of measurement of friction coefficient of the polyalkoxysiloxanes according to example 1, and the results of measurement for the reference oils PDMS 20 and PAO 8 and for the reference hydraulic fluids (FH2 (PAO/ester mixture), FH42 (PAO/ester mixture), Skydrol® type V (aeronautical hydraulic fluid based on organophosphates)) respectively homologated in accordance with the military references MIL-PRF-83282 and MIL-PRF-87257 and civil reference BMS 3-11 type V. PAO 8 designates a polyalphaolefin with a kinematic viscosity of 8 cSt at 100° C.

Under these conditions, the coefficients of friction of the polyalkoxysiloxanes according to the invention (example 1) are less than 0.1 and are therefore appreciably more favourable in terms of lubricity than the aeronautical hydraulic fluid serving as a reference in commercial aviation, namely Skydrol V (BMS 3-11 type V). Among the best polyalkoxysiloxanes in the series prepared, some achieve coefficients of friction (CoF) close to or even less than 0.05, having a very substantial gain compared with the reference military fluids MIL-PRF-83282 and MIL-PRF-87257. This test demonstrates that the polyalkoxysiloxane compounds of the invention make it possible to envisage better protection of hydraulic systems (less wear and less rapid wear on the mechanical parts in movement and in contact with each other).

Tables 3 and 3a below contain the results of the measurements of the physical and chemical properties for the polyalkoxysiloxanes synthesised at examples 1 and 2, and the corresponding values for the reference lubricants: PDMS20 and PAO8.

TABLE 3

| | | | Base oils according to the invention | | | |
|---|---|---|---|---|---|---|
| | Reference oils | | PAS4 | PAS5 | PAS6 | PAS7 |
| Characteristics | PDMS20 | PAO8 | Ex. 1 | Ex. 1 | Ex. 1 | Ex. 1 |
| Coefficient of Friction (CoF) | >0.25 | 0.100 | 0.049 | 0.061 | 0.087 | 0.056 |
| Kinematic viscosity at (cSt): | | | | | | |
| 100° C. | 6.30 | 8 | 6.48 | 5.57 | 5.59 | 6.24 |
| 40° C. | 14.70 | 48 | 20.24 | 15.89 | 17.24 | 18.9 |
| −40° C. | | 19000 | 460 | 256 | 421 | 730 |
| Viscosity index | 467 | 139 | 324 | 345 | 312 | 325 |
| COC flashpoint (° C.) | 248 | 260 | 152 | 160 | 194 | 220 |
| Pour point. (° C.) | <−72 | −48 | <−72 | −93 | −93 | <−72 |

| | Base oils according to the invention | | | | | |
|---|---|---|---|---|---|---|
| | PAS8 Ex. 1 | PAS9 Ex. 1 | PAS10 Ex. 1 | PAS12 Ex. 1 | PAS16-18 Ex. 1 | PAS7 Ex. 2 |
| Coefficient of Friction (CoF) | 0.068 | | 0.096 | 0.091 | 0.041 | |
| Kinematic viscosity at (cSt): | | | | | | |
| 100° C. | 7.11 | 7.49 | 7.76 | 9.31 | 14.0 | 5.25 |
| 40° C. | 25.77 | 28.12 | 28.91 | 37.8 | 69.4 | 16 |
| −40° C. | 1390 | | Fixed | Fixed | | 643 |

TABLE 3-continued

| | | | | | | |
|---|---|---|---|---|---|---|
| Viscosity index | 262 | 254 | 259 | 242 | 211 | 309 |
| COC flashpoint (° C.) | 216 | | 266 | | 248 | 214 |
| Pour point (° C.) | | −60 | −39 | −6 | 9 | −96 |
| Fire point (ASTM D 92) | | | | | | 234 |
| Water content (ASTM D 1533) in mg/kg | | | | | | 183 |

The boxes labelled NP in table 3 correspond to measurements that were not made or which could not be made in light of the behaviour of the oil under the measurement conditions.

The coefficient of friction (CoF) values demonstrate the superiority in terms of lubricity of the polyalkoxysiloxanes according to the invention compared with the polydimethylsiloxane oils and polyalphaolefins.

The kinematic-viscosity and viscosity-index values demonstrate that the polyalkoxysiloxane oils according to the invention have a highly advantageously fluidity relatively close to those of polydimethylsiloxane oils over a wide thermal amplitude.

The pour point values, in particular those below −45° C., kinematic viscosity values, in particular those below 28 cSt at 40° C. and/or those below 15,000 cSt at −40° C., and flashpoint values demonstrate that the polyalkoxysiloxane oils according to the invention can advantageously combine, with their lubricating properties, dielectric fluid properties for use at very low temperature compatible with very cold regions (Russia, Canada, etc).

TABLE 4

| Characteristic | Unit | Base oil PAS7 | Phosphate ester (product Skydrol ® type V) |
|---|---|---|---|
| Flashpoint | ° C. | 220 | 166 |
| Fire point | ° C. | 246 | 192 |
| Stability under KRL mechanical shearing after 100 h (CEC-L-45-A-99) | | | |
| Variation in kinematic viscosity at 40° C. | % | 3.0 | −26.4 |
| Variation in kinematic viscosity at 100° C. | % | −0.9 | −32.7 |
| Variation in viscosity index | — | −17 | −136 |

These results in table 4 show that the base oil according to the invention has characteristics of safety and stability under shearing (simulating the severe mechanical stresses exerted on the fluid in particular in pumps operating in a pressurised environment) superior to those of the reference hydraulic fluid of commercial aviation (e.g.: Skydrol®), which makes it a candidate of choice for any substitution. It should be noted that the compounds of the invention behave at a very high performance level under the effect of shearing in comparison with the Skydrol® type V product (reference fluid on the aeronautical market) for which the rheology decreases very appreciably after only 100 hours of shearing (the drop in the viscosity index indicating here a drastically different behaviour at high and low temperatures).

Example 4: Study of Compatibility with Other Base Oils

Mixtures of a base oil according to the invention (example 1) with various other base oils were produced, and the compatibility thereof was studied for various proportions of base oil according to the invention with another base oil (0:100, 10:90, 50:50, 90:10 and 100:0), and at various temperatures (100° C., ambient temperature, 5.9° C. and −30° C.). The base oil according to the invention is an oil of formula (I) with R1=methyl, R2=heptyl, R3=methyl, x=0 and y=1 to 140.

An absence of cloudiness or separation demonstrating very good compatibility of the base oil according to the invention with the other base oil could be observed for mixtures in all proportions and at any temperature with the polyalphaolefins of kinematic viscosity at 100° C. of 4, 6 and 8 cSt respectively, designated PAO4, PAO6 and PAO8.

Likewise, very good compatibility of the base oil according to the invention was demonstrated at high temperature (100° C. in all proportions with the polyalphaolefins PAO100 of kinematic viscosity at 100° C. of 100 cSt.

Finally, very good compatibility of the base oil according to the invention was demonstrated at 100° C., ambient temperature and 5.9° C. in all proportions with the paraffinic mineral oils known by the names 150 Neutral Solvent®, 600 Neutral Solvent® and BSSO (Bright Stock Solvent).

Example 5: Study of Compatibility with Antiwear Additives in this example, the compatibility of the polyalkoxysiloxane base oil according to the invention (here the compound PAS7 described in example 1) with the following antiwear additives was measured:

a) tri(methyl silyl) phosphate,
b) tris(trimethylsiloxy) boron
c) (diethylphosphatomethyl)triethoxysilane measuring in particular the mechanical performance in accordance with ASTM D4172 (4-ball wear, 1 hour, 40 kg, 75° C., 1200 revolutions per minute).

The results are presented in table 5 below:

TABLE 5

| | 1 | 2 | 3 | 4 | 5 | 6 | 7 |
|---|---|---|---|---|---|---|---|
| Composition | PAS7 (oil alone) | PAS7 + a) 1% | PAS7 + a) 3% | PAS7 + b) 1% | PAS7 + b) 3% | PAS7 + c) 1% | PAS7 + c) 3% |
| Mechanical performance (wear diameter) | 1.54 | 1.06 | 0.85 | 1.3 | 1.26 | 1.12 | 0.93 |

This example shows that adding antiwear additives to the polyalkoxysiloxane base oil according to the invention makes it possible to form a lubricating composition having significantly improved mechanical performance.

Example 6: Study of Compatibility with Flame-Retarding Additives

In this example, the compatibility of the polyalkoxysiloxane base oil according to the invention (here the compound PAS7 described in example 1) with flame-retarding additives as listed below was measured, as well as their effects on the autoignition temperature of the mixtures obtained.

The results are presented in table 6 below:

TABLE 6

| Base oil | Flame retardant | Mass proportion of flame-retardant additive | Auto-ignition temperature (° C.) |
|---|---|---|---|
| Organophosphates (HYJET V) | N.A. | N.A. | 391 |
| Organophosphates (SKYDROL ® PE 5) | N.A. | N.A. | 396 |
| PAS7 | None | 0% | 385 |
| PAS7 | Isodecyl diphenyl phosphate | 5% | 393 |
| PAS7 | isodecyl diphenyl phosphate | 10% | 403 |
| PAS7 | isodecyl diphenyl phosphate | 15% | 407 |
| PAS7 | Phenol, isobutylene, phosphate (3:1) | 5% | 390 |
| PAS7 | Phenol, isobutylene, phosphate (3:1) | 15% | 409 |

This example shows that adding flame-retarding additives is chemically possible and enables the polyalkoxysiloxane base oil according to the invention to form a lubricating composition having an autoignition temperature higher than that of the base oil (PAS7) as well as those of the reference hydraulic fluids such as Skydrol® type V and Hyjet V. This is undeniably a P highly advantageous safety element (against fire).

Example 7: Other Synthesis of Polyalkoxysiloxanes According to the Invention (from Two Alcohols)

For this comparative study, the experimental conditions are identical to those described for example 1 above, i.e.: the polymethyl hydrosiloxane (PMHS) is Silres® BS94 and the catalyst is caesium fluoride CsF, except that the starting alcohol was replaced by a mixture of n-heptanol and phenol while varying their molar ratios: 50% phenol/50% n-heptanol and 25% phenol/75% n-heptanol. For information, the characteristics of the polyalkoxysiloxanes obtained were compared with those of the compound PAS7 synthesised in accordance with example 1 according to the invention.

The polyalkoxysiloxanes that were synthesised in accordance with the above protocol are presented in table 7.

TABLE 7

| PAS | Alcohol introduced into the synthesis | R1 | R2 | R3 | x | Polymeric fraction y |
|---|---|---|---|---|---|---|
| PAS7 (example 1) | n-heptanol | methyl | n-heptyl | methyl | 0 | 1 to 140 |
| PAS7(a) (example 7) | 75% n-heptanol/ 25% phenol/ | methyl | n-heptyl or phenyl | methyl | 0 | 1 to 140 |
| PAS7(b) (example 7) | 50% n-heptanol/ 50% phenol/ | methyl | n-heptyl or phenyl | methyl | 0 | 1 to 140 |

The mean value of y for each of the polyalkoxysiloxane oils of table 1 is between 50 and 60.

The characterisation of the polyalkoxysiloxanes obtained is illustrated in table 8 below. The characteristics tested are those defined in example 3.

TABLE 8

| Characteristics | PAS7 | PAS7(a) | PAS7(b) |
|---|---|---|---|
| Coefficient of friction (CoF) | 0.056 | 0.116 | 0.087 |
| Kinematic viscosity at (cSt): | | | |
| 100° C. | 6.24 | 6.89 | 6.01 |
| 40° C. | 18.9 | 23.1 | 21.0 |
| −40° C. | 730 | 1495 | 2662 |
| Viscosity index | 325 | 291 | 263 |
| Water content (ppm) (ASTM D1533) | 64 | 6 | 13 |
| Pour point (° C.) | <−72 | −84 | −75 |

This test shows firstly that the polyalkoxysiloxanes according to the invention PAS7(a) and PAS7(b), in which the R2 group varies in one and the same compound and can here be either a phenyl group or a heptyl group, have a very low coefficient of friction (much below 0.5), equivalent to the polyalkoxysiloxane PAS7 of example 1. These compounds PAS7(a) and PAS7(b) comprising a phenyl R2 group therefore have excellent lubricity.

Naturally, various other modifications can be made to the invention within the scope of the accompanying claims.

The invention claimed is:

1. A method for lubricating comprising utilizing a lubricating agent which is a polyalkoxysiloxane base oil of formula (I)

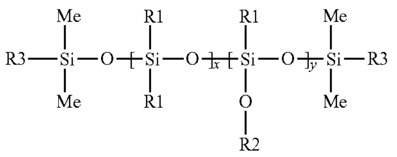

(I)

wherein each R1 is independently a C1 to C4 alkyl group or a phenyl, each R2 is independently a C2 to C22 alkyl or alkenyl group or a phenyl, R3 is either a methyl group, or a $CH_2$ group, connected to the other R3 group by a single bond, thus forming a ring in which the 2 terminal silicon atoms are connected by a $CH_2$—$CH_2$ bridge, x is equal to 0, y is an integer between 1 and 500, or a mixture of polyalkoxysiloxane base oils of formula (I), and wherein the coefficient of friction, CoF, measured for the polyalkoxysiloxanes of formula (I) is below 0.1.

2. The method according to claim 1, wherein x is equal to 0 and each R1 is selected independently from the methyl, ethyl and phenyl groups.

3. The method according to claim 1, wherein each R2 is independently a C4 to C18 alkyl or alkenyl group.

4. The method according to claim 3, wherein each R2 is independently a C4 to C12 C18 alkyl or alkenyl.

5. The method according to claim 1, wherein each R3 is a methyl group.

6. The method according to claim 1, wherein y is between 1 and 140.

7. The method according to claim 1, wherein the polyalkoxysiloxane is selected from the group consisting of the polyalkoxysiloxanes of formula (I) wherein:

x=0, y is between 1 and 140, each R1 is a methyl, each R3 is a methyl and each R2 is an n-butyl chain, x=0, y is between 1 and 140, each R1 is a methyl, each R3 is a methyl and each R2 is a heptyl chain, x=0, y is between 1 and 140, each R1 is a methyl, each R3 is a methyl and each R2 is a dodecyl chain, x=0, y is between 1 and 140, each R1 is a methyl, each R3 is a methyl and each R2 is a tetradecyl chain, and x=0, y is between 1 and 140, each R1 is a methyl, each R3 is a methyl and each R2 is selected from the group consisting of octadecenyl and hexadecyl chains.

8. The method according to claim 1, wherein the polyalkoxysiloxane base oil of formula (I) is used to form a dielectric fluid, a cooling fluid or a hydraulic fluid.

9. The method according to claim 1, wherein the polyalkoxysiloxane base oil of formula (I) is used in a mixture with at least one other base oil as a co-base.

10. Lubricating composition, characterised in that it comprises a polyalkoxysiloxane base oil of formula (I) according to claim 1 and at least one additive.

11. Lubricating composition according to claim 10, wherein said at least one additive is selected from the group consisting of extreme-pressure additives, antiwear additives, detergent additives, viscosity-modifying additives, antifoaming additives, antioxidant additives, flame retardants, corrosion inhibitors and a combination of at least two of said additives.

12. Lubricating composition according to claim 10, wherein said composition comprises at least one flame-retarding additive, so as to obtain a non-flammable hydraulic fluid.

13. Polyalkoxysiloxane of formula (II)

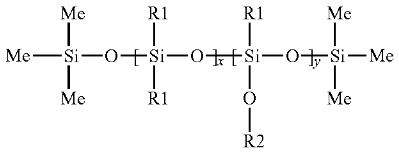

(II)

wherein each R1 is independently a C1 to C4 alkyl group or a phenyl, each R2 is independently a C4 to C16 alkyl or alkenyl group, or a phenyl, x is equal to 0, y is an integer between 1 and 500, and wherein the coefficient of friction, CoF, measured for the polyalkoxysiloxanes of formula (II) is below 0.1.

14. Polyalkoxysiloxane of formula (II) according to claim 13, wherein each R1 is selected independently from the methyl, ethyl and phenyl groups;

each R2 is independently a C4 to C14 alkyl or alkenyl group, or a phenyl group, provided that, when R2 is a phenyl group, the latter represents at least 50% of the unit repeated y times;

each R3 is a methyl group;

x=0; and y is between 1 and 140.

15. Polyalkoxysiloxane of formula (II) according to claim 14, wherein each R1 is selected independently from the methyl, ethyl groups;

each R2 is independently a C4 to C12, or a phenyl group, provided that, when R2 is a phenyl group, the latter represents at least 50% of the unit repeated y times.

16. Polyalkoxysiloxane of formula (I) according to claim 13, selected from the group consisting of the polyalkoxysiloxanes of formula (II) in which:

x=0, y is between 1 and 140, each R1 is a methyl, and each R2 is an n-butyl chain, x=0, y is between 1 and 140, each R1 is a methyl, and each R2 is a heptyl chain, x=0, y is between 1 and 140, each R1 is a methyl, and each R2 is a dodecyl chain, x=0, y is between 1 and 140, each R1 is a methyl, and each R2 is a tetradecyl chain, and x=0, y is between 1 and 140, each R1 is a methyl, and each R2 is selected from the group consisting of octadecenyl and hexadecyl chains.

* * * * *